UNITED STATES PATENT OFFICE.

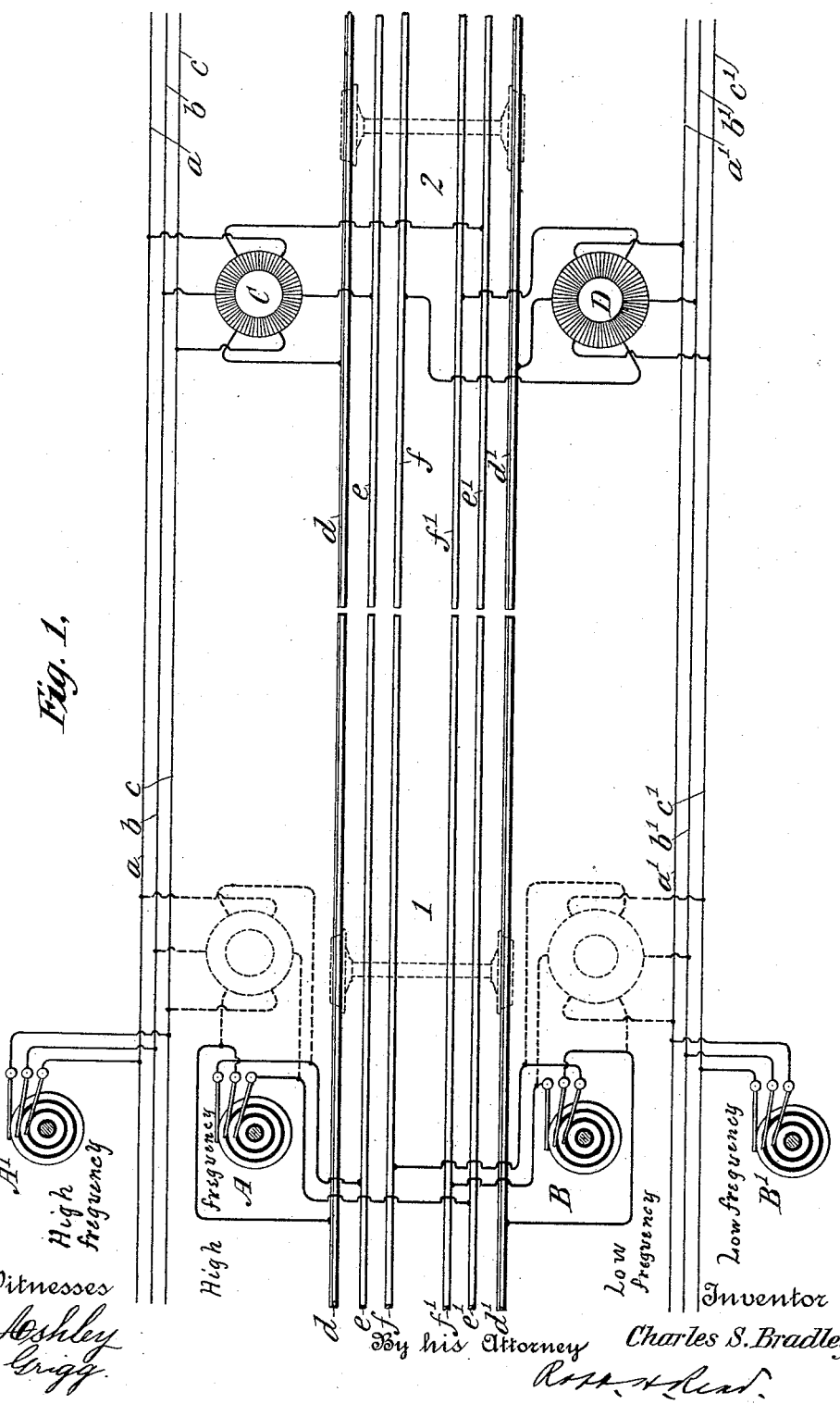

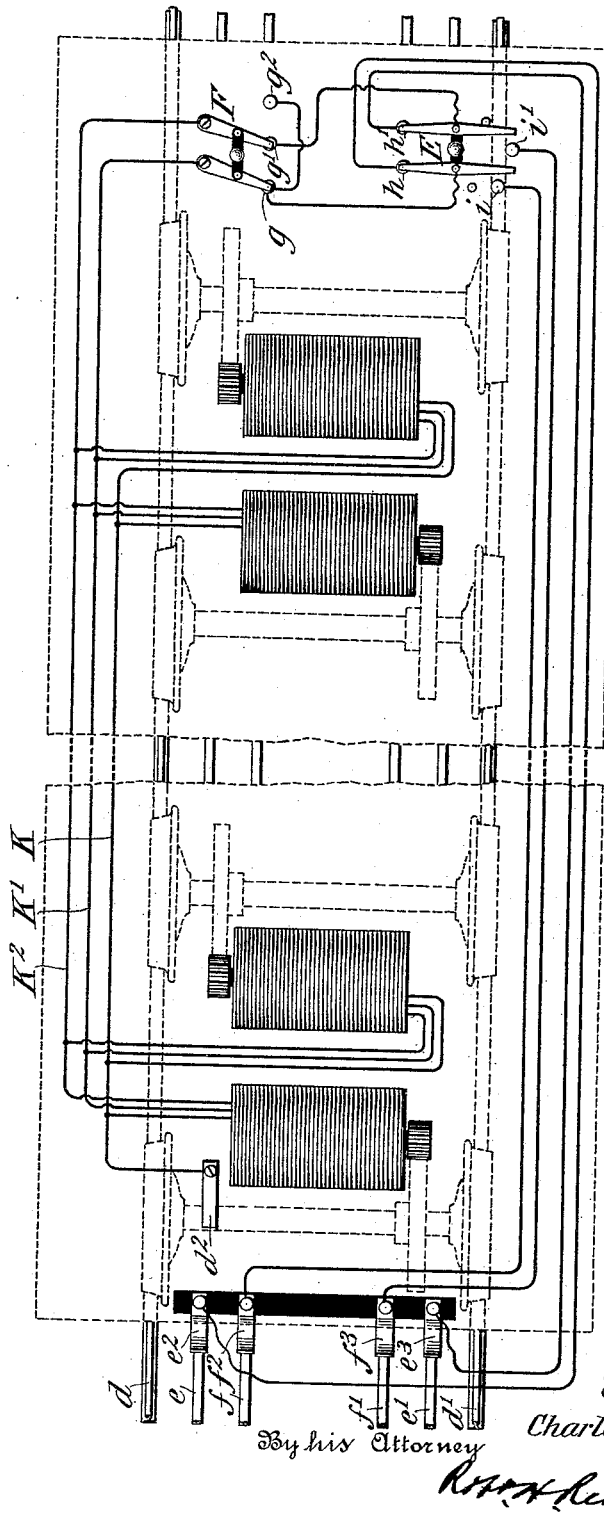

CHARLES S. BRADLEY, OF AVON, NEW YORK.

ELECTRIC-RAILWAY SYSTEM.

SPECIFICATION forming part of Letters Patent No. 525,690, dated September 11, 1894.

Application filed January 2, 1894. Serial No. 495,287. (No model.)

*To all whom it may concern:*

Be it known that I, CHARLES S. BRADLEY, a citizen of the United States, residing in Avon, in the county of Livingston and State of New York, have invented certain new and useful Improvements in Electric-Railway Systems, of which the following is a specification.

This invention relates to electric railroads.

The object of the invention is to provide a system in which the motors may be started and gradually accelerated in speed without the necessity of resistance or starting switches as ordinarily employed.

The invention is particularly applicable to motors operated by polyphase alternating currents which do not require for their operation the employment of a commutator.

In carrying out my invention I provide a line of way comprising two supply circuits carrying alternating currents of different characters, one of which will operate the motors at high speeds, and the other of which will operate them at low speeds. For railway systems of such length as may be supplied throughout their length by direct connection with the supply mains, two such generators will be sufficient, but where the railway line is of such a length that it would be more economical to supply distant parts of the line through the instrumentality of transformers, an auxiliary pair of generators may be employed, one of high and one of low frequency, for imposing upon line high tension currents to supply the reducing transformers of the remote sections. The supply station should preferably be located at a central point of the system. Each motor car is supplied with a simple switch under the control of the motor-man, by which either the high or low frequency generator may be connected in operative relation to the motors. Thus, in starting, the switch may be thrown in a position to connect the low frequency generator with the motors, in which case a comparatively slow rotation of the armature will be developed and a great torque. After the motor and its train has received the desired degree of acceleration the switch will be shifted so as to place the motor under control of the generator of higher frequency, whereby the armature will be driven at a high rate of speed. The motor is provided with a reversing switch by which the direction of movement of the motor car may be reversed.

My invention therefore comprises a system of transmission of power provided with a plurality of alternating current supply generators of different frequency, connected with distributing lines, and motors adapted to be supplied by the several lines. More specifically it comprises an electric railway system so organized as to permit a train to be controlled by a polyphase alternating current of high or low frequency at the will of the motor-man. It comprises also other features, which will be more particularly hereinafter described, and which will be definitely indicated in the claims appended to this specification.

In the accompanying drawings, Figure 1 is a diagrammatic view of a system embodying my invention, and Fig. 2 is a diagrammatic plan view of a motor car adapted to co-operate with the system, parts being broken away in order to bring the organization illustrated within the field of the drawing.

In Fig. 1 of the drawings I have shown a system organized for railway installation where the track is of such a length that ordinary voltages, say, five hundred volts, would be insufficient to supply energy to the entire line without extraordinary outlay for copper. Part of the system is adapted for direct supply, and the parts remote from the supply station for supply through the intermediation of reducing transformers, receiving their energy from well insulated mains carrying high tension currents.

Referring first to Fig. 1, A, A' and B, B' represent polyphase generators located at a supply station at the central portion of a railway line. The machines A and B are so arranged as to develop in the line a lower potential than the machines A' and B'. The machines A and B may, therefore, be connected directly with section 1 of the railway system, and A' and B' may be connected with insulated circuits $a$, $b$, $c$, $a'$, $b'$, $c'$ extending parallel to the railway and connected at suitable intervals through reducing or step-down transformers C and D with the supply conductors of remote sections, such as 2, of the railway; or, in lieu of separate machines A', B', step-up transformers may be used, the primaries of which connect with machines A, B, and the secondaries of which connect with the circuits $a$, $b$, $c$, $a'$, $b'$, $c'$, as indicated in dotted lines. The current supplied by machines A, A' is such as will efficiently operate the motors when the trains are under speed. In order to accelerate the motors in starting, the auxiliary generators B, B' are similarly arranged, so far as their connections with the supply conductors of the line of way are concerned, to the machines A, A', but are constructed and operated to develop polyphase alternating currents of a lower frequency. The rail joints of each section are bonded by good conductors so that each section if connected at a single point with the source of supply, will furnish current to a motor at any part of the section. The track rails $d$, $d'$ being electrically connected by the wheels and axles of the train, constitute practically a common conductor, and are connected with a common wire of both the high and low frequency generators. As shown in the drawings the middle brush of each generator is connected with the rails $d$, $d'$. These rails form a common return for both generators and need not be carefully insulated. The system herein described is especially applicable to elevated or under-ground systems, or such systems as may have the supply conductors placed on the surface of the road-bed. The conductors $e$, $f$ and $e'$, $f'$ should be well insulated, the conductors $e'$, $e$ being connected respectively with the other brushes of machine A, and the conductors $f'$, $f$ being connected respectively with the other brushes of machine B. A similar arrangement of the conductors of section 2, and such other sections as there may be in the system, is made with relation to the low tension supply terminals of reducing transformers C and D. The transformer D being designed to cooperate with the low frequency generator B', may be given an increased cross-section in its magnetic circuit, as indicated in the diagram. A single transformer may be used for the several currents or independent transformers may be used. The motor car, as seen in Fig. 2, is at all times connected through its wheels with the conductors $d$, $d'$ and through brushes $e^2$, $f^2$, $e^3$, $f^3$ with the supply conductors $e$, $f$, $e'$, $f'$. The motor car may be provided with as many motors as are needed for an efficient operation of the system. As shown in the diagram four are provided. Such a motor car may draw a plurality of trail cars. A controlling switch E for connecting either the high or low frequency circuit with the motors, and a reversing switch F for reversing the direction of travel of the armature, are provided on each motor car. The controlling switch E will preferably be a double switch, the fulcral point of the two arms being connected with the contacts $g$, $g'$, $g^2$ of the reversing switch F. Contacts $h$, $h'$ of the controlling switch are connected through brushes $e^2$, $e^3$ with supply conductors $e$, $e'$ controlled by the high frequency generators. The contacts $i$, $i'$ are connected through brushes $f^2$, $f^3$ with supply conductors $f$, $f'$ controlled by the low frequency supply generators. A brush $d^2$ may lead current from conductors $d$, $d'$ by being connected with the wheels of a car truck. From this brush may extend a conductor K, and from the pivotal points of the reversing switch F may extend conductors K' and K², these three conductors forming a common system of supply for all the motors of the car. The motors may be tapped in parallel with these conductors, as indicated in the diagram. As shown in the diagram the controlling switch E is in operative relation to the contacts $h$, $h'$. Supply conductors $e$, $e'$ controlled by the high frequency generator are therefore in working relation to the motors, and the latter are in a condition for operating at high speed. If, now, for any reason, the car or train is obliged to stop or slacken its speed, switch E may be thrown off its contacts. When starting up again, if the high frequency circuit were immediately put into operative relation to the motor, the rotary poles developed by the high frequency polyphase currents would have such a high speed of rotation with relation to the motor armature that a very weak torque would be developed. In order to overcome this difficulty starting resistances are ordinarily employed with each motor for controlling the strength of current in the secondary circuit of the motor. Such devices are not only expensive in construction but are liable to derangement, and require care and a certain degree of skill on the part of the motor-man. By employing a current of lower frequency I dispense with the necessity of such regulating devices, for inasmuch as the current of lower frequency develops a slower revolution of the poles, a strong torque may be developed in the motor when starting by simply throwing the switch E to a position which will supply the motor with the low frequency currents. When the car or train has accelerated in speed the switch may be thrown upon the contacts $h$, $h'$ when the motor or train will be brought up to full speed. In reversing, the switch F is thrown upon contacts $g'$, $g^2$, which, as will be seen, reverses the order of delivery of the polyphase currents in two of the three supply conductors, and consequently reverses the direction of rotation of the magnetic poles, thus operating the motor in a reverse direction to that which follows when the switch connects with contacts $g$, $g'$. The motors employed are of the induction type, in one element of which shifting or rotating poles are developed, and the other element of which is acted upon inductively. The former element may be connected at appropriate points of its circuit with conductors K, K', K². The latter element may be constructed in any approved manner. I prefer, however, to construct the secondary element in accordance with a patent issued to me, No. 404,465, dated June 4, 1889. The motors may be arranged to act in any suitable manner upon the axles of the car. As shown in the diagram, they are connected by single reduction gearing with the axles. It will thus be seen that the duties of the motor-man do not require any high degree of skill, two simple switches, one of which may give either high or low speed according to its position, and the other of which may reverse the direction of movement of his car and the ordinary brake appliances, being the only elements which require his attention. The conductors $e, f, e', f'$ in the several sections are preferably mounted upon insulating chairs and will be continuous for the section, or each section, where more than one is needed, of the track.

Having thus described my invention, what I claim as new, and desire to secure by Letters Patent, is—

1. An electric system of transmitting power comprising a plurality of alternating current generators organized to impose on line currents of different frequency, distributing lines supplied thereby, and alternating current motors adapted to be connected with any of the several distributing lines.

2. An electric railway system comprising a plurality of stationary supply generators adapted to develop polyphase alternating currents of different frequency, distributing lines severally connected with such generators, and motor cars provided with polyphase motors adapted to connect with any of the several lines.

3. An electric railway system comprising a plurality of stationary supply generators adapted to develop polyphase alternating currents of different frequency, distributing lines severally connected with such generators, motor cars provided with polyphase motors, controlling switches for connecting the motor with any of the several lines, and reversing switches for changing the order of delivery of the polyphase currents.

4. An electric railway system comprising a supply station provided with apparatus to develop high tension polyphase alternating currents of different frequency, a reducing transformer along the track for supplying track or trolley conductors with working potentials at the several frequencies, and motor cars provided with switches for connecting the motors with any set of conductors.

In testimony whereof I have hereunto subscribed my name this 29th day of December, A. D. 1893.

CHARLES S. BRADLEY.

Witnesses:
ROBT. H. READ,
E. C. GRIGG.